(12) United States Patent
Ikonen et al.

(10) Patent No.: US 10,497,009 B2
(45) Date of Patent: Dec. 3, 2019

(54) DELIVERY OF ADVERTISEMENTS IN MOBILE ADVERTISING SYSTEM

(75) Inventors: Teemu Aaron Ikonen, Espoo (FI); Janne Alho, Espoo (FI); Timo Markus Ahomäki, Espoo (FI)

(73) Assignee: MAVENIR SYSTEMS OY, Espoo (FI)

( * ) Notice: Subject to any disclaimer, the term of this patent is extended or adjusted under 35 U.S.C. 154(b) by 775 days.

(21) Appl. No.: 12/668,837

(22) PCT Filed: Jul. 16, 2008

(86) PCT No.: PCT/FI2008/050433
§ 371 (c)(1),
(2), (4) Date: May 8, 2010

(87) PCT Pub. No.: WO2009/010636
PCT Pub. Date: Jan. 22, 2009

(65) Prior Publication Data
US 2010/0241508 A1    Sep. 23, 2010

(30) Foreign Application Priority Data

Jul. 17, 2007    (FI) .................................... 20075547

(51) Int. Cl.
*G06Q 30/02* (2012.01)
(52) U.S. Cl.
CPC ......... *G06Q 30/02* (2013.01); *G06Q 30/0243* (2013.01); *G06Q 30/0244* (2013.01); *G06Q 30/0246* (2013.01)

(58) Field of Classification Search
CPC .............. G06Q 30/02; G06Q 30/0243; G06Q 30/0244; G06Q 30/0246; G06C 30/02;
(Continued)

(56) References Cited

U.S. PATENT DOCUMENTS 5,619,695 A * 4/1997 Arbabi .................. G06F 9/4881
718/100
5,893,077 A    4/1999 Griffin
(Continued)

FOREIGN PATENT DOCUMENTS

KR    20030028287 A    4/2003
KR    20040093248 A    11/2004
(Continued)

OTHER PUBLICATIONS

International Search Report in parent application No. PCT/FI2008/050433.
(Continued)

*Primary Examiner* — Eric R Netzloff
(74) *Attorney, Agent, or Firm* — Ohlandt, Greeley, Ruggiero & Perle L.L.P.

(57) ABSTRACT

Disclosed is a method and an advertising system for delivering advertisements in a mobile communication network. The method comprises detecting a need to deliver an advertisement, and arranging said delivery such that one or more indicators of advertisement behavior specific to individual recipients of advertisements and/or to the overall system are taken into account, delivery of advertisements in mobile advertising system.

19 Claims, 4 Drawing Sheets

(58) Field of Classification Search
CPC ............ G06C 30/0243; G06C 30/0244; G06C 30/0246
USPC ................................. 705/14.42, 14.43, 14.45
See application file for complete search history.

(56) References Cited

U.S. PATENT DOCUMENTS

| | | | |
|---|---|---|---|
| 5,937,345 A | 8/1999 | McGowan et al. | |
| 5,937,392 A | 8/1999 | Albert | |
| 6,047,327 A | 4/2000 | Tso et al. | |
| 6,182,050 B1 | 1/2001 | Ballard | |
| 6,195,543 B1 | 2/2001 | Granberg | |
| 6,381,465 B1* | 4/2002 | Chern ................... | H04L 51/38 340/7.21 |
| 6,983,311 B1 | 1/2006 | Haitsuka et al. | |
| 7,680,487 B2* | 3/2010 | Harris .................. | H04W 72/12 379/88.22 |
| 8,000,993 B2* | 8/2011 | Harvey et al. ............... | 705/7.29 |
| 8,423,408 B1* | 4/2013 | Barnes et al. .............. | 705/14.49 |
| 8,744,951 B2* | 6/2014 | Jobs et al. ...................... | 705/37 |
| 8,799,123 B2* | 8/2014 | Kalliola ................. | G06Q 10/06 705/35 |
| 2002/0023274 A1 | 2/2002 | Giacalone | |
| 2002/0072965 A1* | 6/2002 | Merriman ............. | G06Q 30/02 705/14.49 |
| 2002/0194062 A1 | 12/2002 | Linde et al. | |
| 2003/0115098 A1 | 6/2003 | Kang | |
| 2003/0208754 A1 | 11/2003 | Sridhar | |
| 2003/0212745 A1 | 11/2003 | Caughey | |
| 2003/0217139 A1 | 11/2003 | Burbeck et al. | |
| 2004/0029759 A1 | 2/2004 | Casiez | |
| 2004/0059708 A1 | 5/2004 | Dean et al. | |
| 2004/0117451 A1 | 6/2004 | Chung | |
| 2004/0186776 A1 | 9/2004 | Llach | |
| 2004/0193488 A1* | 9/2004 | Khoo et al. ...................... | 705/14 |
| 2004/0194131 A1* | 9/2004 | Ellis et al. ...................... | 725/34 |
| 2004/0255025 A1 | 12/2004 | Ricagni | |
| 2005/0014483 A1 | 1/2005 | Lagerstrom | |
| 2005/0091367 A1 | 4/2005 | Pyhalammi et al. | |
| 2005/0108340 A1 | 5/2005 | Gleeson et al. | |
| 2005/0216334 A1* | 9/2005 | Mehrabani-Farsi ............ | 705/14 |
| 2006/0089880 A1 | 4/2006 | Merriman et al. | |
| 2006/0242587 A1 | 10/2006 | Eagle et al. | |
| 2006/0253328 A1* | 11/2006 | Kohli .................... | G06Q 30/02 705/14.53 |
| 2006/0265368 A1 | 11/2006 | Nickerson et al. | |
| 2006/0293949 A1* | 12/2006 | Grossnickle et al. .......... | 705/14 |
| 2007/0038516 A1 | 2/2007 | Apple | |
| 2007/0067267 A1 | 3/2007 | Ives | |
| 2007/0088851 A1 | 4/2007 | Levkovitz et al. | |
| 2007/0105536 A1* | 5/2007 | Tingo, Jr. ................ | G06Q 30/02 455/414.1 |
| 2007/0150606 A1 | 6/2007 | Flinchem et al. | |
| 2007/0157227 A1 | 6/2007 | Carpenter et al. | |
| 2007/0191040 A1 | 8/2007 | Kadar et al. | |
| 2007/0282954 A1* | 12/2007 | Kim ........................ | G06Q 30/02 709/206 |
| 2008/0147501 A1* | 6/2008 | Gilliam ................ | G06Q 10/107 705/14.66 |
| 2008/0153520 A1* | 6/2008 | Kirtane .................. | G06Q 30/00 455/466 |
| 2008/0228893 A1* | 9/2008 | MacDonald et al. ......... | 709/207 |
| 2008/0243619 A1* | 10/2008 | Sharman ................ | G06Q 30/02 705/14.54 |
| 2008/0279113 A1 | 11/2008 | Kaliolla | |
| 2009/0199114 A1* | 8/2009 | Lewis et al. ................... | 715/763 |
| 2010/0161492 A1* | 6/2010 | Harvey et al. ................... | 705/50 |
| 2010/0241508 A1* | 9/2010 | Ikonen et al. ............. | 705/14.42 |

FOREIGN PATENT DOCUMENTS

| | | |
|---|---|---|
| WO | 1997/21183 | 6/1997 |
| WO | 1997/40447 | 10/1997 |
| WO | 2000/77978 A2 | 12/2000 |
| WO | WO2000/77978 | 12/2000 |
| WO | 2002/076077 A1 | 9/2002 |
| WO | 2004/029759 | 4/2004 |
| WO | 2007/012118 A1 | 2/2007 |
| WO | 2007/014047 A1 | 2/2007 |
| WO | 2009/010634 A1 | 1/2009 |
| WO | 2009/010636 A1 | 1/2009 |

OTHER PUBLICATIONS

3 GPSS TS 23.140 v6.9.0.
"Mobile Marketing for Vendors", Internet Document http//:web.archive.org/web/20040103072039/http://www.regisoft.com/docs/vendor-mobile-marketing.pdf.
Scharl A, et al. "Diffusion and success factors in mobile marketing", Electronic Commerce REsearch and Applications 4 (2005) 159-173, Elsevier B.V. 200.
Iddris, F. "Mobile Advertising in B2C markets" master Thesis 2006 Lulea University of Technology, 2006-11 ISSN 1653-0187 ISRN LTU-PB-EX-0611-SE.pdf.
European Patent Office examination report of corresponding application EP 08 775 543.5 2201.

* cited by examiner

DELIVERY OF ADVERTISEMENTS IN MOBILE ADVERTISING SYSTEM

FIELD OF THE INVENTION

The present invention generally relates to delivery of advertisements for a particular end user or end user group in a mobile advertising system. The invention relates particularly, though not exclusively, to selection of advertisements to be delivered to a particular end user or end user group.

BACKGROUND OF THE INVENTION

There are currently various efforts ongoing in relation to advertising in mobile communication systems. Compared to for example Internet advertising, in mobile communication networks there is the advantage that the identities of individual users are known whereby new opportunities arise for targeting advertisements to users.

For example a mobile network operator may operate as an advertising broker, which is an entity that maintains portfolios of advertisements to be delivered to end users. The advertisements may then be delivered to their recipients attached to connections or messages originating from other users or external systems and/or dedicated connections or messages may be used for delivering the advertisements.

While in some cases it may make sense to match advertisements with individual users, the more likely scenario is to target well defined micro segments (that is, groups of users). These segments are typically created using two different processes: static and dynamic profiling. In static profiling, the network operator uses traditional demographic segmentation, possibly amended with some user-expressed preferences, to segment the entire user base. In dynamic segmentation, the operator uses actual, real-time usage information gathered from the network to refine the static profiling.

Advertising campaigns are typically created using multiple selection criteria, such as target segment, target timeslot and/or target location and so forth. Based on these parameters, the advertisements content is then delivered to end users. The final segmentation of the user base is thus a result of both static and dynamic segmentation, meaning that there may be infinitely many segments and that an individual user may simultaneously belong to arbitrarily many segments. It is then challenge of the advertising system to deliver the advertisements to "right" recipients.

Google™ AdSense service is one prior art example of a system which tries to match advertisements with the content delivered to the recipients. The system is based on word analysis, that is, if certain word/words exist in the content that is delivered to the recipient (for example through a web page), delivery of certain advertisement/advertisements is triggered. A disadvantage of this system is that it sometimes attaches completely inappropriate or unrelated advertisements to the content. It may for example attach an advertisement of CD burners to a news clip that concerns a fire.

Another kind of a prior art system utilizes only static segmentation data to target the advertisements. For example, taking into account only basic demographic information like user's age, gender and billing address a system can make assumptions on generic categories of advertising suitable to the user. However, no user interest is captured in such static targeting model. A static targeting system can be further enhanced by including a user questionnaire to capture interests. Such questionnaires carry two drawbacks, though; users are generally reluctant to respond to long lists of questions and in addition their interests can change over time, making the initial responses invalid. Both incomplete responses and shifting interests result in poorly targeted campaigns.

Additionally, an advertising system may at the same time serve different advertisers that may have conflicting and/or competing campaigns, which may have at least partially overlapping target segments. That is, certain user may be included in target segment of various campaigns. It is however not desirable (neither for the advertisers nor the users) to deliver conflicting and/or competing campaigns to the same user at the same time. Moreover it is not desirable to overwhelm a user with a load of advertisements at the same time.

Thus an advertising system has the challenge to match suitable advertising content to the various segments in campaigns so that both the advertisers and the end users are best served. That is, the advertising system needs to have all advertising campaigns delivered to often very tightly defined target segments and at the same time to take care of that user experience does not deteriorate.

The existing systems do not always succeed in this very well. Thus, further improvement considerations are needed.

SUMMARY

According to a first aspect of the invention there is provided a method for delivering advertisements in a mobile communication network, the method comprising detecting a need to deliver an advertisement, and arranging said delivery such that one or more indicators of advertisement behaviour specific to individual recipients of advertisements and/or to the overall system are taken into account.

In an embodiment said advertisement behaviour comprises advertisement history and/or delivery schedule already agreed for certain advertisements.

In an embodiment said indicators comprise one or more of the following: length of the advertisement text, total number of advertisements that have already been sent to said recipient, number of advertisements that have been sent to said recipient during certain period of time, number of times that particular advertisement has already been sent to said recipient, total number of times the advertisement has already been sent to any recipient, number of times the advertisement has already been sent to any recipient during certain period of time, advertisement bias, and similarity of said advertisement and the advertisements that have already been sent to said recipient.

In an embodiment said indicators comprise one or more of the following: opt-out windows defined for individual recipients, other advertisements scheduled for individual recipients, overall or recipient specific number of advertisements that have already been allocated to a time period.

In an embodiment, the method further comprises detecting a need to deliver an advertisement to a specific recipient, ordering a set of advertisements that may be sent to said recipient in order of preference on the basis of said one or more indicators of advertisement behaviour, selecting the most preferred advertisement, and delivering said selected advertisement to said recipient.

In an embodiment, the method further comprises excluding from delivery an advertisement that was previously sent to the recipient.

In an embodiment said ordering and selecting comprise
computing a score to the advertisements of the set, and
selecting the advertisement with the highest score.

In an embodiment, the method further comprises
detecting a need to deliver an advertisement to a group of recipients over a certain period of time,
scheduling delivery of the advertisement to individual recipients on the basis of said one or more indicators of advertisement behaviour, and
delivering said advertisement as scheduled.

According to a second aspect of the invention there is provided an advertising system for delivering advertisements in a mobile communication network, the advertising system comprising
a memory, and
a processing unit coupled to the processing unit, the processing unit being configured to detect a need to deliver an advertisement, and to arrange said delivery such that one or more indicators of advertisement behaviour specific to individual recipients of advertisements and/or to the overall system are taken into account.

According to a third aspect of the invention there is provided a memory medium comprising computer executable program code adapted to enable an apparatus to perform the method of the first aspect or any related embodiment.

Any foregoing memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

In many of the following examples advertisements are attached to peer-to-peer messages that one user sends to another user. Additionally or alternatively, advertisements can be attached in various other types of traffic, such as application-to-peer messaging, browsing events, video streams or dedicated advertising messages. The messages that are used for delivering the advertisements may be for example SMS or MMS messages or some other messages used in mobile communication systems.

Figure 1:
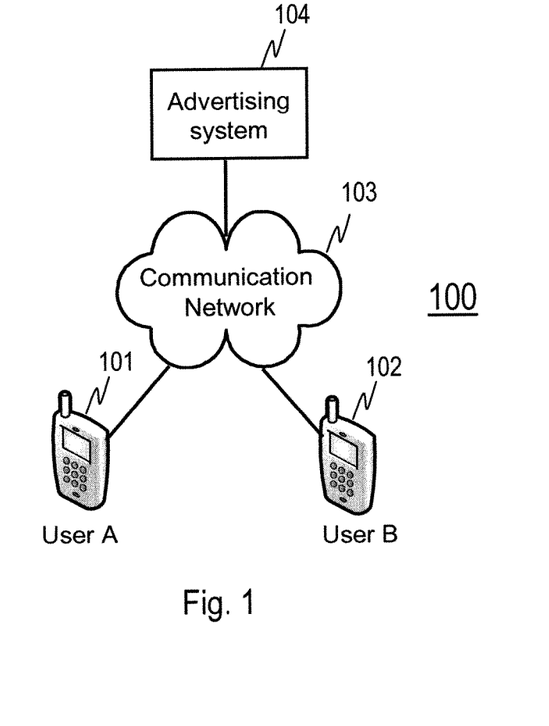
FIG. 1 shows a block diagram of a system according to an embodiment of the invention.

FIG. 1 shows a block diagram of a system according to an embodiment of the invention. The system comprises two end users, user A 101 and user B 102, which are connected to a communication network 103 for example via an air interface offered by base stations and other network elements of the communication network (not shown in the figure). Further the system comprises an advertising system 104, which is connected to the communication network 103 or part of the communication network 103. The advertising system 104 is configured to intercept for example messages transferred between the end users 101 and 102 and to attach suitable advertising content to them. Additionally, the advertising system 104 may be configured to attach suitable advertising content to any other messages or connections destined to one of the end users 101 and 102 and/or to send advertising content to the end users 101 and 102 in dedicated messages or connections.

It must be noted that the system of FIG. 1 may, and usually does, comprise various additional components offering different types of functionalities or services needed in the communication network, but those additional components are not shown herein for the sake of simplicity.

Figure 2:
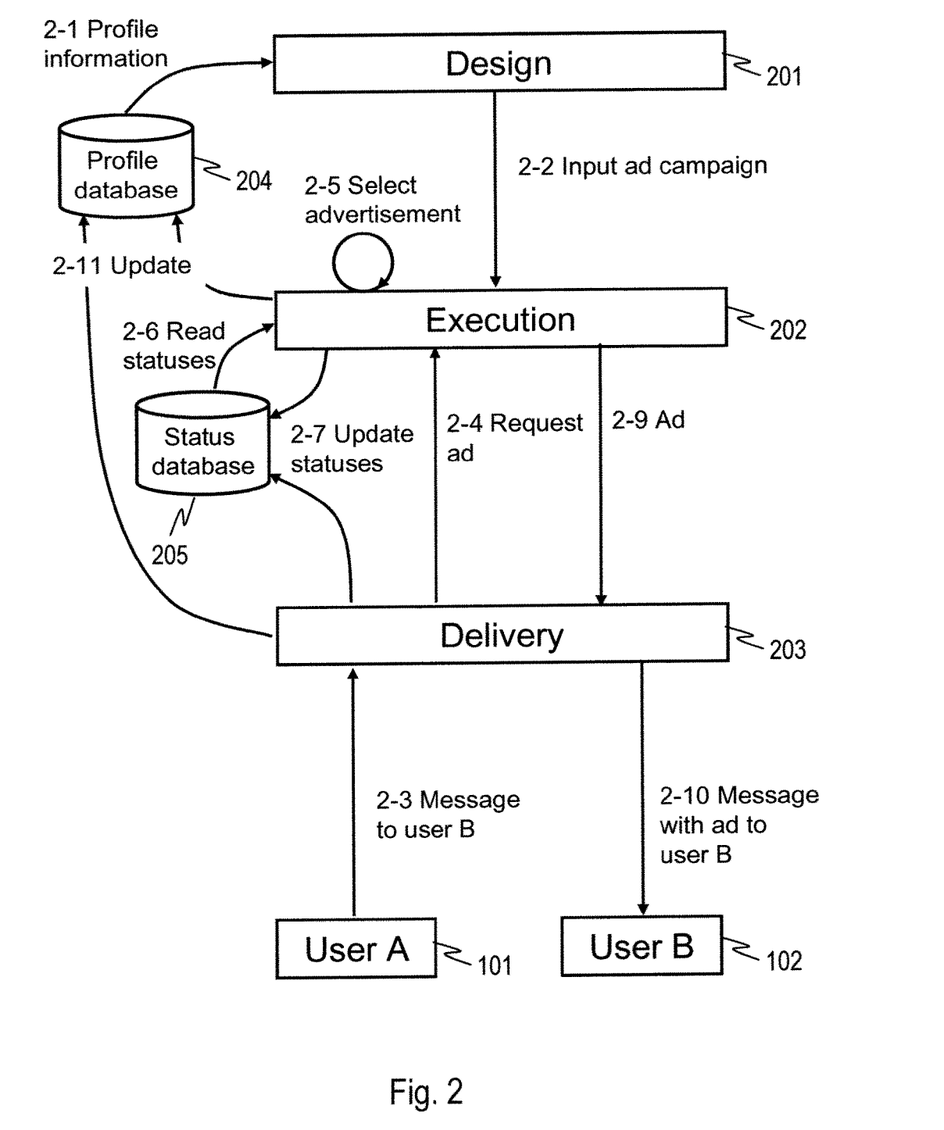
FIG. 2 shows logical components of a system according to an embodiment of the invention.

FIG. 2 shows logical components of a system according to an embodiment of the invention. The system comprises three processing layers: design 201, execution 202, and delivery 203. The processing layers co-operate with a profile database 204 and a status database 205. Further the system comprises two end users: user A 101 and user B 102.

It must be noted that for example the processing layers of FIG. 2 are logical components and that each of them may involve one or more physical components. They may be processes running in the same physical device or in two or more separate physical devices. Also the databases of FIG. 2 may reside in the same physical device with the processing layers or alternatively they may reside in different physical devices. Furthermore some other data storage may replace the databases.

In an embodiment of the invention the system of FIG. 2 operates as follows.

First an advertising campaign is designed in the design layer 201. For finding suitable target group for the campaign, user profile information 2-1 is pulled from the profile database 204. Then the advertising campaign 2-2 comprised of a recipient list identifying the target group of users specified for the campaign and the advertising content(s) belonging to this campaign is input to the execution layer. The execution layer may for example instantiate the advertising campaign, reserve delivery resources and create a mapping between the content of the campaign and individual users belonging to the target group to be accessed at run time. The campaign (consisting of the target group (segment) and the individual the advertisement(s) of the campaign) is then ready for delivery.

Now one must note that there may be a plurality of different campaigns ongoing at the same time and that a particular user may belong to target group of various different campaigns at the same time. For this reason, campaign design phase cannot take into account factors that depend on other campaigns or state of the users of the target group. Such factors need to be assessed at run time.

Let's then assume that the user A sends a message 2-3 to the user B. The message may be for example an SMS or MMS message. The delivery layer 203 intercepts this message. In an embodiment of the invention, the delivery layer is part of or integrated to functionality that provides transfer of messages, which is typically a messaging center such as SMSC or MMSC, and the delivery layer intercepts and examines all messages that are transmitted through the message transfer functionality. Alternatively the delivery layer may intercept and examine only messages that fulfill some predefined criteria. Additionally or alternatively, messages may be intercepted also in case the messaging protocol that is used supports separate forward operation. For example if user A forwards certain MMS message to user B without editing the message, the terminal of the user A may use a "MM1_Forward.REQ" operation defined in 3GPP TS 23.140 V6.9.0, in which only identifier of the message is actually forwarded from user A to user B and the content is delivered to user B from the messaging system on the basis of the forwarded identifier. In this case the intercepting may happen between the messaging center and the user. Still another possibility is to have the intercepting functionality integrated directly to the network without any messaging center. An example of such integrated intercepting functionality is SMS interception on SS7 (Signaling System #7) telecom signaling level.

The delivery layer requests 2-4 an advertisement to be attached to the message 2-3 from the execution layer. The execution layer selects suitable advertisement for the message based on various factors which are discussed in more detail further below. The selection process may be based on one or more indicators of advertisement behaviour specific to individual recipients of advertisements and/or to the overall system. During the selection process the execution layer may read 2-5 status information relating to the sender and/or the receiver of the message (that is, user A or user B) or to various advertisements that are currently in the system. The status information may comprise for example information relating to how many times and when a specific advertisement has been delivered, and/or which advertisements and when a specific user has already received. After selecting the advertisement the execution layer may update 2-6 the status database to reflect the selection. Additionally or alternatively, the status database may be updated only after actual delivery of the advertisement. In that case it may be the delivery layer that updates the status database 205.

After having selected the advertisement, the execution layer responds with the selected advertisement 2-9 and the delivery layer attaches the advertisement to the message 2-3 and forwards the resulting message 2-9 to the user B.

In a similar manner as discussed above, advertising content may be selected also for any other type of messages or connections.

Additionally, the execution and delivery layers may update 2-11 the profile database 204 in various phases of the procedure.

The processing of the messages in FIG. 2 may also comprise some billing (postpaid, prepaid or both) activities, e.g. writing respective CDRs (call data record). Also some external system may be notified of the advertisement delivery.

Figure 3:
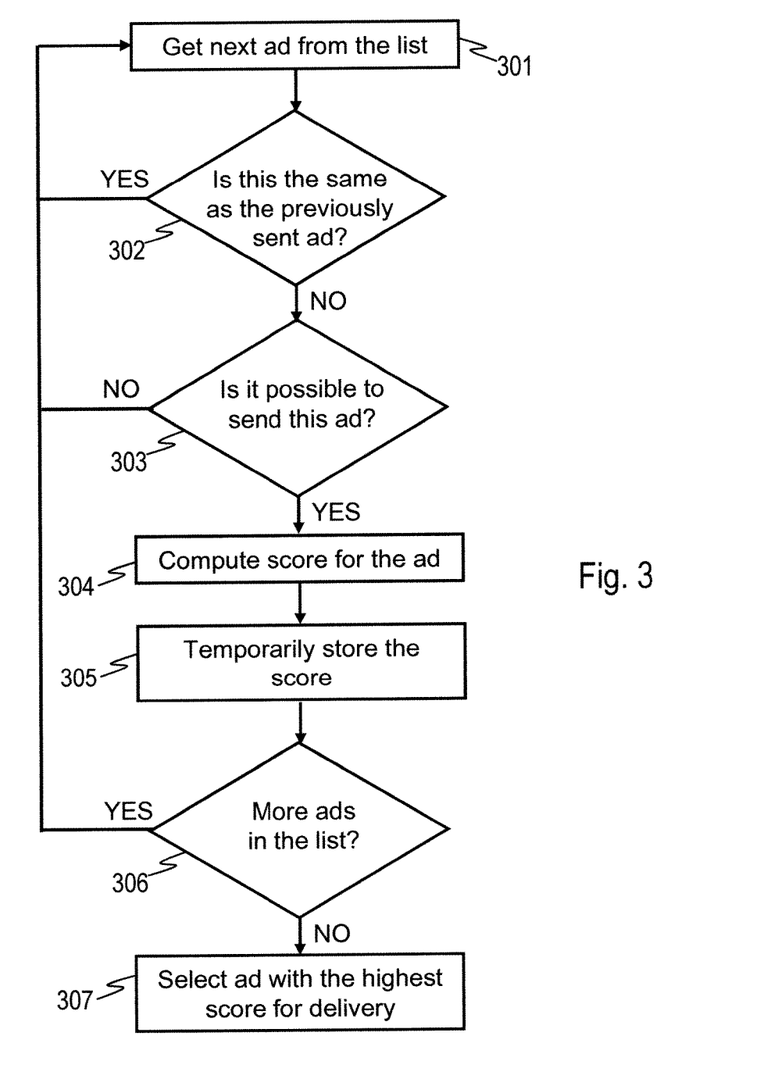
FIG. 3 is a flow diagram illustrating an algorithm used for selecting an advertisement in an embodiment of the invention.

FIG. 3 is a flow diagram illustrating an algorithm used for selecting an advertisement in an embodiment of the invention. This algorithm may be used for example in the selection phase 2-4 of FIG. 2. Input for the algorithm is a recipient and a list of possible advertisements that may be sent to that particular recipient. That is, the list of possible advertisements includes the campaigns to whose target segment that particular recipient belongs. The algorithm proceeds as follows:

1. Process the list of possible advertisements as follows:
    1-1. Get next advertisement from the list, phase 301.
    1-2. If this advertisement is the same as the advertisement that was previously sent the subscriber, return to step a, phase 302.
    1-3. If this advertisement cannot be sent at the moment, return to step a, phase 303. There may be various reasons for not being able to send a particular advertisement at a particular moment. For example, the user may have opted out of certain campaigns during certain time periods or there may be some other reason for a certain advertisement not being available. In some cases, the advertisement that cannot be sent at the moment may be temporarily removed from the list of possible advertisements for a certain period of time (e.g. for a day). One reason for this may be for example that there are advertisements of two directly competing companies (e.g. different cola drinks). In that case every other day may be used for sending advertisements of one cola drink, while the remaining days are used for sending advertisements of another cola drink, for example.
    1-4. Select the advertisement.
    1-5. Compute score for the selected advertisement, phase 304. The score may be computed based on one or more of the following input parameters: length of the advertisement text, total number of advertisements that have been sent to the receiver of the message, number of advertisements that have been sent to the receiver of the message during that day (or some other period of time), number of times that particular advertisement has already been sent to the receiver of the message, total number of times the advertisement has already been sent to any user, number of times the advertisement has already been sent to any user during that day (or some other period of time), advertisement bias, similarity of the selected advertisement and the advertisements that have already been sent to the user, and other parameters. The score may be computed for example as polynomial of the input parameters. These input parameters may be generally seen as indicators of advertisement history specific to the recipient of the advertisement and/or as advertisement history of the overall system.
    1-6. Temporarily store the score, phase 305.
    1-7. Return to step 1-1 until the list is exhausted, phase 306.
2. After the whole list has been processed, the advertisement with the highest score is selected for delivery, phase 307.

In this way one may achieve the benefit of providing maximum diversity of advertising content to all subscribers while at the same time maintaining a very tight segmentation and personalization. That is, by taking into account at least some indicators of the advertisement history one may achieve that advertisements are selected so that maximum diversity is provided for the recipients of the advertisements and at the same time a fair share of views is given for each advertisement in the system. One of the thing that may help in achieving this is to take into account the number of times a specific advertisement can be used for a specific recipient or in total (as defined in the campaign). The use of global parameters in the score computation may help in ensuring that next advertisement that will be sent to a particular recipient cannot be forecasted by the users as for example all other user messages affect the outcome. The bias factor can be used to artificially boost some advertisement. The length of an advertisement may be used to determine how many message segments (e.g. in an SMS message) are required for delivering the advertisement. This may have a significant effect because if delivery of the advertisement requires more messages also additional expenses are incurred. For this reason one may aim to minimize the amount of traffic required to deliver the original message payload+the advertisement.

User and advertisement statuses are stored and updated realtime for example in the status database 295 of FIG. 2 so that they are available for the algorithm. In this way one may avoid sending the same advertisement twice in a row. Furthermore one may set a maximum for the number of times a certain advertisement can be sent to the same recipient and realtime updating of the statuses allows keeping track on that this maximum is not exceeded.

Optionally input for the selection algorithm may be the sender and the recipient of a message (or even the recipient may suffice). In that case the advertisement selection algorithm may further include selecting, whether a sender or receiver profile is to be used. This selection may be configured beforehand or it may be based on profile availability. Then a list of possible advertisements available for the selected profile is fetched and processed as discussed above. Such lists are provisioned to the system beforehand for example based on static segmentation.

In an embodiment of the invention, an advertisement is delivered in a dedicated advertising message. One may for example wish to schedule mass broadcast campaigns for a large number of recipients. The target recipients are selected for such campaign in a similar manner as described above, that is, on the basis of static and dynamic segmentation. Typically there is however at least some variation in the times when the advertisement is delivered to the recipients of such mass broadcast campaign. For example one or more of the following matters may have an effect on delivery of the campaign:

The recipients may have defined opt-out windows or other restrictions when they do not want to receive any advertisements or certain types of advertisements.

Certain user segment may be "fully booked" for certain time periods with other, possibly conflicting or competing advertisements or just any advertisements.

The delivery system itself may have capacity limitations for some timeslots.

The advertiser may define some time restrictions for the campaign. As an example, it may have been defined that the advertisements should be sent slowly throughout a day or some other specific time period/time periods (even distribution) or that the advertisements should be sent as fast as possible (asap delivery).

Figure 4:
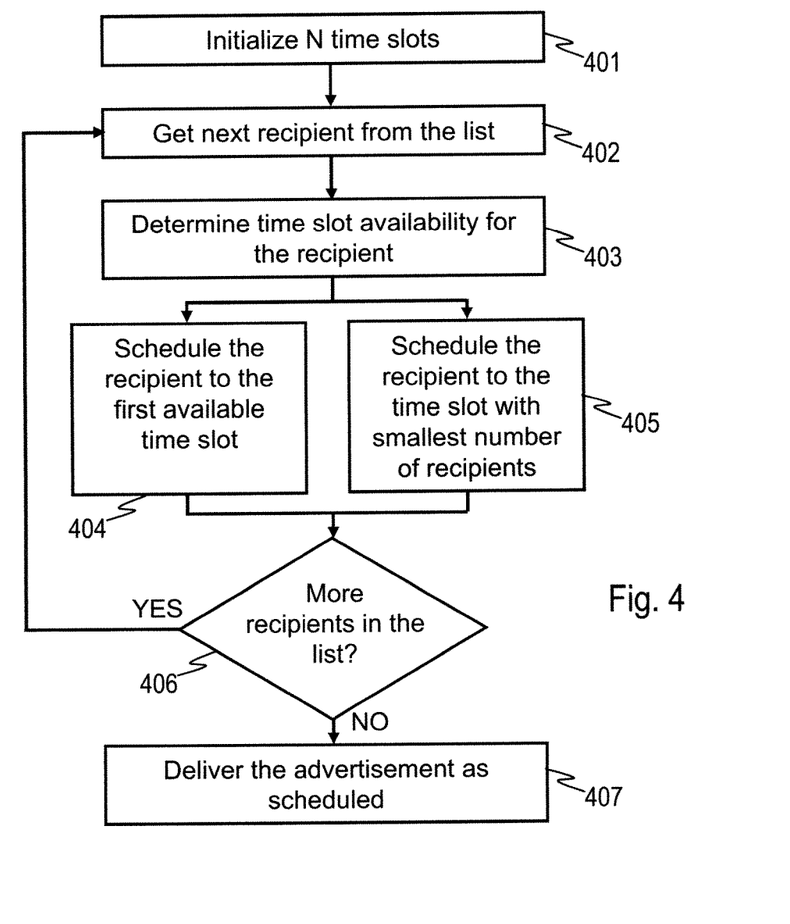
FIG. 4 is a flow diagram illustrating an algorithm used for scheduling delivery of an advertisement in an embodiment of the invention.

FIG. 4 is a flow diagram illustrating an algorithm used for scheduling delivery of an advertisement in an embodiment of the invention. The algorithm may be used for example for arranging delivery of a mass broadcast campaign. Input for the algorithm is an advertisement and a list of desired recipients. The list of desired recipients may have been defined beforehand on the basis of any suitable static and/or dynamic segmentation mechanism. The algorithm takes into account advertisement behaviour of the system and/or individual users including for example advertisement history and/or delivery schedule already agreed for certain advertisements. The algorithm proceeds as follows:

1. Initialize N time slots between the start and end time of the campaign, phase 401. One time slot may be for example one hour. It must be noted that a time slot herein does not refer to a time slot known from cellular systems. Instead time slot means herein some predefined length of time, such as one hour.
2. Take next recipient from recipient list, phase 402.
   2-1. Determine time slot availability based on delivery restrictions, phase 403. The delivery restrictions that are taken into account when determining time slot availability may comprise for example opt-out windows defined for that specific recipient, the total number of advertisements scheduled for the recipient, campaigns of competing advertisers scheduled for the recipient, advertiser specific priorities or paid premium slot, recipient specific number of messages/advertisements that have already been allocated to a certain time slot etc.
   2-2. asap delivery: Schedule the recipient to the first available time slot, phase 404.
   2-3. even distribution: Among the available time slots, schedule the recipient to the time slot that has smallest number of scheduled recipients, phase 405.
3. Return to step 2 until the recipient list is exhausted, phase 406.
4. Deliver the advertisement as scheduled, phase 407.

The determination of the availability if the time slots may additionally take into account global allocation. For example if for 13:00 the number of messages that is required for delivering the already booked advertisements is already near the limit of overall system capacity or the advertisement quota allocated for an individual user, it may be excluded from the array of available time slots used by the algorithm. Further the algorithm may take into account current time zone or local time of the users and adjust the delivery time accordingly.

With the selection algorithms according to various embodiments of the invention one may achieve:

a) best match to selected segment taking into account the "booking ratio" of that segment at any given time for any campaign, and/or b) maximum variety of advertisements for any given subscriber across all campaigns.

It must be noted that the order of the phases shown in FIGS. 3 and 4 is not restrictive. Instead, the phases may be conducted in different order and moreover some of the phases may be left out from a certain implementation and some of the phases may be repeated a plurality of times.

In yet another embodiment of the invention the scheduling algorithm discussed in connection with FIG. 4 is first used for roughly scheduling advertisement delivery and thereafter the advertisement selection algorithm discussed in connection with FIG. 3 is used for deciding more accurately on the delivery order at run time. The scheduling algorithm may be run for example daily as some advertising campaigns expire and new ones are taken in.

The invention may be implemented by means of a computer program running on a suitable hardware platform or by means of any other suitable combination of hardware, software, special purpose circuits and/or logic.

Figure 5:
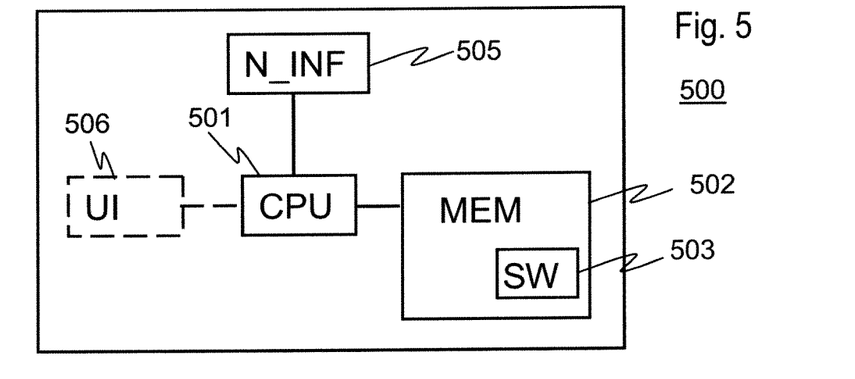
FIG. 5 shows a block diagram of a device suited for implementing various embodiments of the invention.

FIG. 5 shows a block diagram of an apparatus 500 suited for implementing various embodiments of the invention. The apparatus 500 may be a typical computer, such as a general-purpose computer or a server, with possibly distributed functions. The apparatus comprises a processor 501 for controlling the apparatus and a memory 502 including a computer program code or software 503. The processor 501 is typically a central processing unit (CPU) or a master control unit MCU. Alternatively, the processor may be a microprocessor, a digital signal processor, an application specific integrated circuit, a field programmable gate array, a microcontroller or a combination of such elements.

The software 503 includes instructions for the CPU 601 to control the apparatus 500 such as an operating system and different computer applications. The software 503 may comprise instructions for controlling the apparatus to provide some functionality of the invention. The instructions may for example control the apparatus to operate as an advertising system according to some embodiments of the invention.

The apparatus 500 further comprises a network interface unit N_INF 505 such as a LAN (Local Area Network), Ethernet or WLAN (Wireless LAN) unit. The apparatus 600 could also comprise a user interface (not shown), such as a display and a keyboard, but the user interface may be implemented also by means of a remote connection through the network interface unit.

It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for delivering electronically-represented advertisements to user devices in a mobile communication network, the method comprising:
   obtaining, by a design layer of a processing system of an advertising system, user profile information from a profile database;
   intercepting and examining, by a delivery layer of the processing system of the advertising system, a short message service (SMS) message transmitted from a first user device to a second user device associated with a recipient using the mobile communication network;
   requesting by the delivery layer of the processing system of the advertising system an advertisement to attach to the SMS message;
   determining by an execution layer of the processing system of the advertising system an advertisement to attach to the SMS message based on behaviour of the advertising system, the step of determining the advertisement to attach comprising determining a score for a plurality of selected advertisements, the score based on a length of the respective advertisement text, wherein the length of the advertisement text determines the total number of SMS message segments required for delivering the SMS message and the respective advertisement attached to the SMS message, and determining a selected advertisement with the highest score to minimize SMS message traffic required for delivering the SMS message and the respective advertisement attached to the SMS message;
   receiving by the delivery layer, from the execution layer, a first electronically-represented advertisement comprising the selected advertisement to be delivered to the second user device over a certain period of time;
   determining, by the execution layer, a status of the second user device from a status database;
   scheduling, by the delivery layer, delivery of the first advertisement to the second user device;
   attaching, by the delivery layer, said first electronically-represented advertisement to the SMS message; and
   delivering, by the delivery layer, said first electronically-represented advertisement to the second user device via the communication network as scheduled based on the status;
   wherein said scheduling comprises:
      initializing n time slots to said certain period of time;
      determining time slot availability for each individual recipient on the basis of one or more indicators of advertisement behavior specific to individual recipients of advertisements; and
      scheduling each recipient, among the time slots available for the recipient, to the time slot that has the smallest number of scheduled recipients.

2. The method according to claim 1, wherein the score is further based on one or more of the following input parameters: a number of advertisements that have been sent to the recipient during a period of time, an advertisement bias, and a similarity of the selected advertisement and an advertisement that has already been sent to the recipient.

3. The method according to claim 1, wherein the score is further based on one or more of the following input parameters: a number of advertisements that have been sent to the recipient during a period of time, an advertisement bias, and a similarity of the selected advertisement and an advertisement that has already been sent to the recipient.

4. The method according to claim 1, the method further comprising:
   ordering advertisements scheduled to a certain time slot in order of preference based on one or more indicators of advertisement behavior.

5. An advertising system for delivering advertisements to mobile devices in a mobile communication network, the advertising system comprising:
   a memory;
   a processing unit coupled to the memory, the processing unit being configured to detect a need to deliver an advertisement to a group of recipients over a certain period of time, wherein the processing unit comprises:
      a delivery layer configured to intercept and examine a short message service (SMS) message transmitted from a first user device to a second user device associated with a recipient using the mobile communication network;
      an execution layer configured to determine an advertisement to attach to the SMS message based on behaviour of the advertising system, the step of determining the advertisement to attach comprising determining a score for a plurality of selected advertisements, the score based on a length of the respective advertisement text, wherein the length of the advertisement text determines the total number of SMS message segments required for delivering the SMS message and the respective advertisement attached to the SMS message, and determining a selected advertisement with the highest score to minimize SMS message traffic required for delivering the SMS message and the respective advertisement attached to the SMS message;

wherein the execution layer is further configured to send to the delivery layer a first electronically-represented advertisement comprising the selected advertisement to be delivered to the second user device over a certain period of time;

wherein the delivery layer is further configured to schedule delivery of the first electronically-represented advertisement to the second user device;

wherein the execution layer is further configured to determine a status of the second user device from a status database;

wherein the delivery layer is further configured to attach said first electronically-represented advertisement to said SMS message and deliver said first electronically-represented advertisement to the second user device as scheduled based on the status; and a network interface coupled to the processing unit to enable intercepting the SMS message between the first user device and the second user device;

wherein the processing unit is configured to perform said scheduling by:
  initializing n time slots to said certain period of time;
  determining time slot availability for each individual recipient on the basis of one or more indicators of advertisement behavior specific to the individual recipients of advertisements; and
  scheduling each recipient, among the time slots available for the recipient, to the time slot that has the smallest number of scheduled recipients.

6. The advertising system according to claim 5, wherein the score is further based on one or more of the following input parameters: a number of advertisements that have been sent to the recipient during a period of time, an advertisement bias, and a similarity of the selected advertisement and an advertisement that has already been sent to the recipient.

7. The advertising system according to claim 5, wherein the score is further based on one or more of the following input parameters: a number of advertisements that have been sent to the recipient during a period of time, an advertisement bias, and a similarity of the selected advertisement and an advertisement that has already been sent to the recipient.

8. The advertising system according to claim 5, wherein the processing unit is further configured to:
  order advertisements scheduled to a certain time slot in order of preference based on one or more indicators of advertisement behavior specific to the individual recipients of advertisements.

9. A non-transitory computer-readable storage medium storing a computer program comprising computer executable program code adapted to enable a processing system of an advertising system to perform a method for delivering electronically-represented advertisements to user devices in a mobile communication network, the method comprising:
  obtaining, by a design layer of a processing system of an advertising system, user profile information from a profile database;
  intercepting and examining, by a delivery layer of the processing system of the advertising system, a short message service (SMS) message transmitted from a first user device to a second user device associated with a recipient using the mobile communication network;
  requesting by the delivery layer of the processing system of the advertising system an advertisement to attach to the SMS message;
  determining by an execution layer of the processing system of the advertising system an advertisement to attach to the SMS message based on behaviour of the advertising system, the step of determining the advertisement to attach comprising determining a score for a plurality of selected advertisements, the score based on a length of the respective advertisement text, wherein the length of the advertisement text determines the total number of SMS message segments required for delivering the SMS message and the respective advertisement attached to the SMS message, and determining a selected advertisement with the highest score to minimize SMS message traffic required for delivering the SMS message and the respective advertisement attached to the SMS message;
  sending, by the execution layer, to the delivery layer a first electronically-represented advertisement comprising the selected advertisement to be delivered to the second user device over a certain period of time;
  scheduling, by the delivery layer, delivery of the first electronically-represented advertisement to individual recipients of the group;
  determining, by the execution layer, a status of the second user device from a status database;
  attaching, by the delivery layer, said first electronically-represented advertisement to the SMS message; and
  delivering, by the delivery layer, said first electronically-represented advertisement via the communication network as scheduled based on the status;
  wherein said scheduling comprises:
    initializing n time slots to said certain period of time;
    determining time slot availability for each individual recipient on the basis of one or more indicators of advertisement behavior specific to individual recipients of advertisements; and
    scheduling each recipient, among the time slots available for the recipient, to the time slot that has the smallest number of scheduled recipients.

10. The method according to claim 1, wherein the method is performed at run time during delivery of the advertisement to the individual recipients of the group.

11. The method according to claim 1, further comprising the step of updating a database with information reflecting the delivery of the first electronically-represented advertisement to the individual recipient, wherein the information is used as an advertisement behaviour indicator for scheduling advertisements to the individual recipient.

12. The advertising system according to claim 5, wherein the processing unit is further configured to exclude from delivery an advertisement that was previously sent to the recipient.

13. The non-transitory computer-readable storage medium storing the computer program according to claim 9, the method further comprising the step of updating a database with information reflecting the delivery of the first electronically-represented advertisement to the individual recipient, wherein the information is used as an advertisement behaviour indicator for scheduling advertisements to the individual recipient.

14. The method according to claim 3, further comprising the step of updating a database with information reflecting the delivery of the first electronically-represented advertisement to the individual recipient, wherein the information is used as an advertisement behaviour indicator for scheduling advertisements to the individual recipient.

15. The method according to claim 4, further comprising the step of updating a database with information reflecting the delivery of the first electronically-represented advertisement to the individual recipient, wherein the information is used as an advertisement behaviour indicator for scheduling advertisements to the individual recipient.

16. The advertising system according to claim 6, wherein the processing unit is further configured to perform updating a database with information reflecting the delivery of the first electronically-represented advertisement to the individual recipient, wherein the information is used as an advertisement behaviour indicator for scheduling advertisements to the individual recipient.

17. The advertising system according to claim 6, wherein the processing unit is further configured to order advertisements scheduled to a certain time slot in order of preference based on one or more indicators of advertisement behavior.

18. The advertising system according to claim 8, wherein the processing unit is further configured to perform updating a database with information reflecting the delivery of the first electronically-represented advertisement to the individual recipient, wherein the information is used as an advertisement behaviour indicator for scheduling advertisements to the individual recipient.

19. The non-transitory computer-readable storage medium storing the computer program of claim 9, wherein the score is further based on one or more of the following input parameters: a number of advertisements that have been sent to the recipient during a period of time, an advertisement bias, and a similarity of the selected advertisement and an advertisement that has already been sent to the recipient.

* * * * *